Jan. 11, 1949.   R. P. MESSENGER   2,458,791
STALK FORWARDER FOR CORN PICKERS AND HUSKERS
Filed Oct. 15, 1945   2 Sheets-Sheet 2
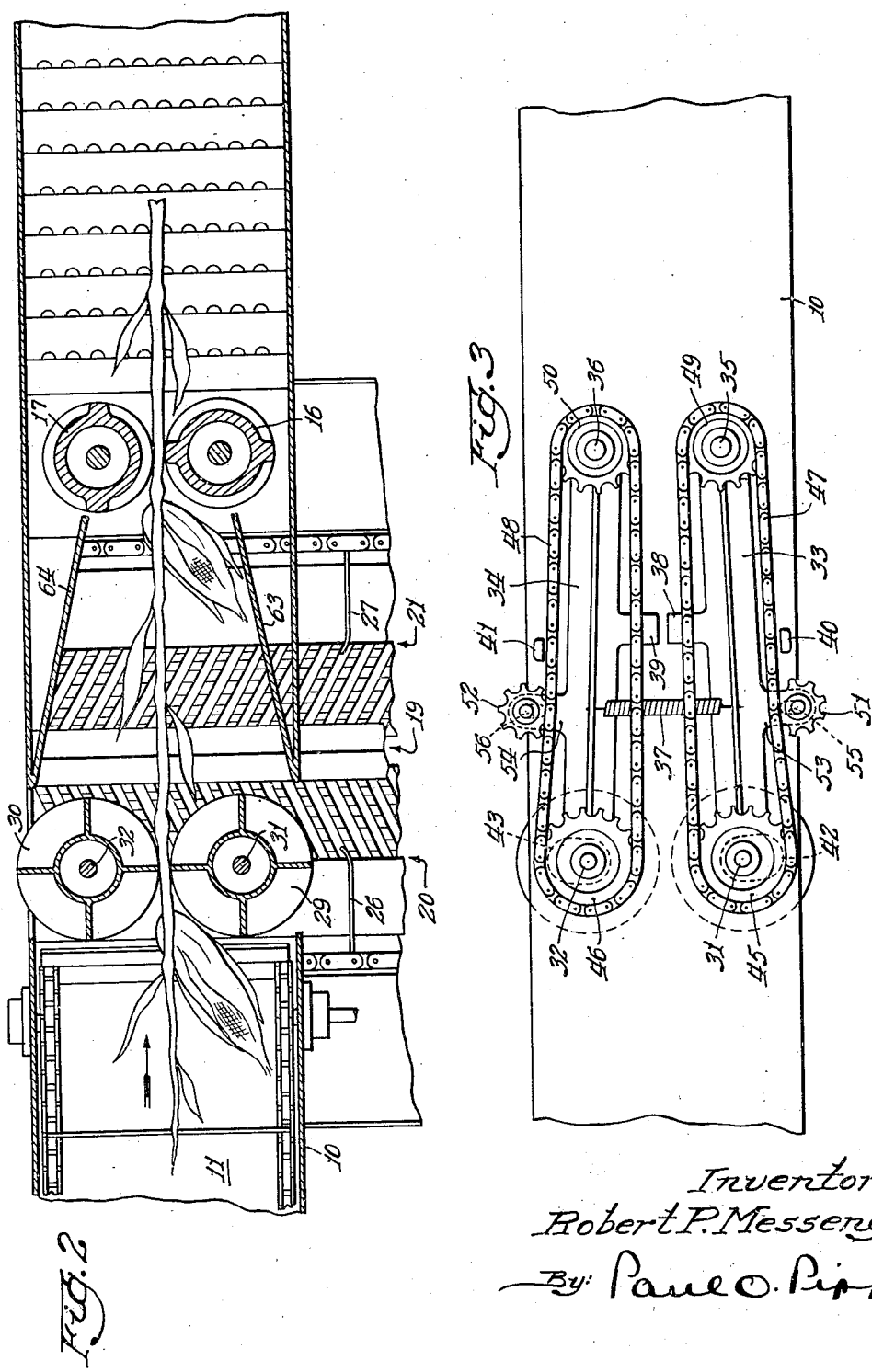
Inventor:
Robert P. Messenger
By: Paul O. Pippel
Atty.

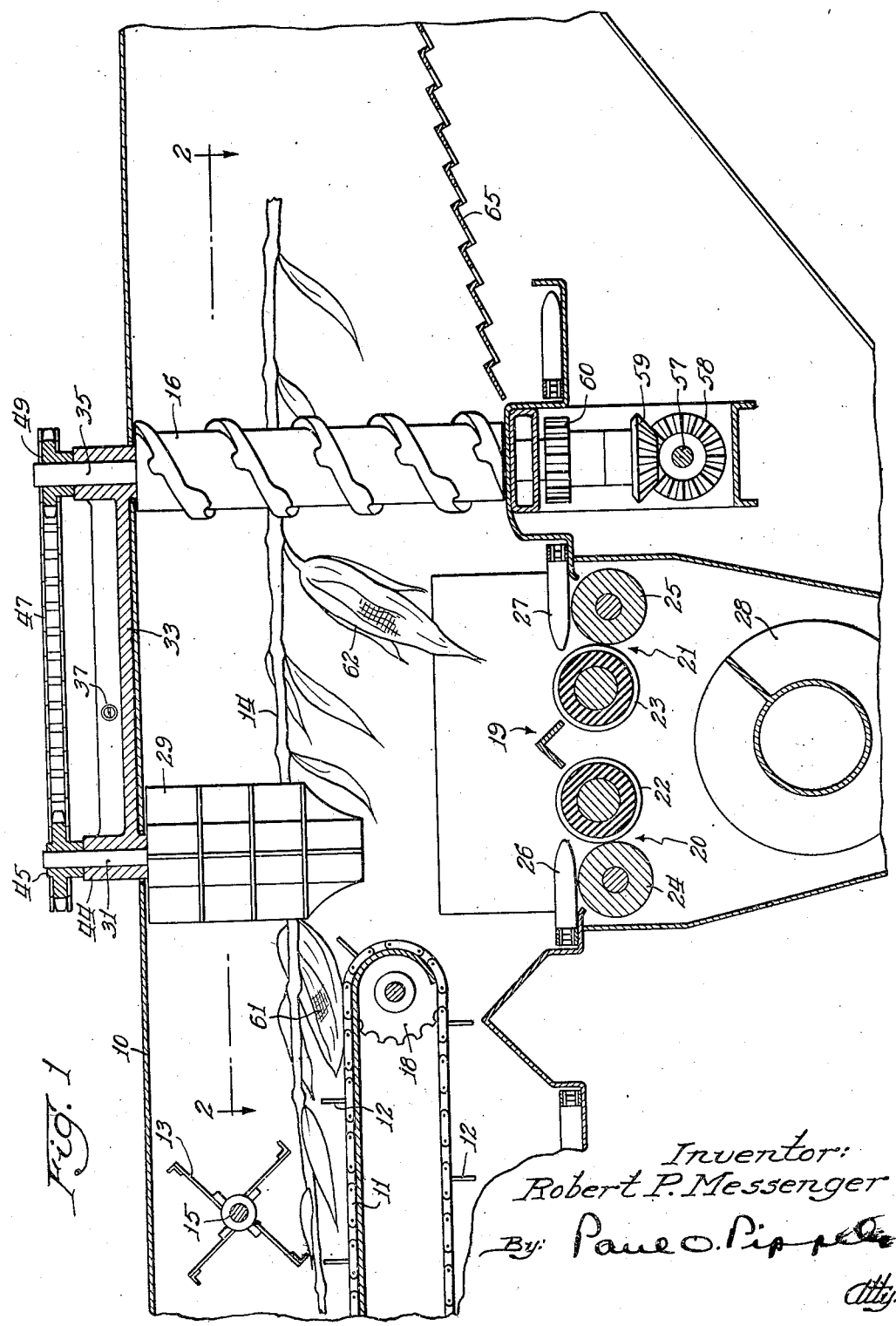

Patented Jan. 11, 1949

2,458,791

UNITED STATES PATENT OFFICE 2,458,791

STALK FORWARDER FOR CORN PICKERS AND HUSKERS

Robert P. Messenger, Kenilworth, Ill., assignor to International Harvester Company, a corporation of New Jersey Application October 15, 1945, Serial No. 622,392

7 Claims. (Cl. 130—33)

This invention relates to a new and improved stalk forwarder for corn pickers and has for one of its principal objects a provision of means for preventing clogging and jamming of the corn stalks prior to snapping and husking.

An important object of this invention is to provide a stalk forwarder for corn pickers, particularly for use in the stalk cut-off type.

Another important object of this invention is to provide a stalk forwarder and guiding means in a corn picker in which the entire stalk is fed horizontally through snapping rolls and the snapped ears are adapted to fall back and downwardly on husking rolls.

A still further important object of this invention is to provide a pair of cooperative stalk forwarding rolls resiliently mounted with respect to each other.

Still a further object of the invention is to provide a pair of cooperative stalk forwarding rolls unjournaled at their lower ends and suspended over a husk removing bed to enable corn stalks in a picker of the cut-off type to bridge the gap between the end of one conveyor and the entrance of the stalk between the ear snapping rolls.

The use of corn pickers which employ sickle means for completely severing the main portion of the stalk from the root and stubble is not in itself new, but the combination of the cut-off type picker with the snapping rolls and husking rolls in a new and novel relationship one to the other, such as shown in the following drawings, is a definite departure from previous corn pickers. In the corn picker, as shown, the stalks are severed and thereupon carried upwardly by gathering chains to a point where they meet a substantially horizontal longitudinal conveyor. The second operation to be performed by the corn picker is the snapping of the ears from the severed stalks. The snapping rolls employed are positioned vertically in the corn picker at a point spaced rearwardly from the end of the horizontal conveyor. The bed of husking rolls is spaced between the horizontal conveyor and the snapping rolls so that the ears, as they are snapped by the snapping rolls, fall forwardly and downwardly to the husking rolls. The severed stalks must therefore bridge the gap between the end of the horizontal conveyor and the relatively far distant spaced snapping rolls. It has been found from actual experiment that the severed stalks cause great congestion in the area above the husking bed for lack of guiding and proper forwarding of the stalk until it is gripped by the snapping rolls. Hence it is the object of this invention to provide a stalk forwarder in a position above the husking bed which will aid the severed stalks in their rearward travel to the snapping rolls which will permit the stalks to be forwarded without contact with the ears on the stalk.

Other and further important objects of this invention will become apparent from the disclosures in the following specification and accompanying drawings, in which:

Figure 1 is a vertical longitudinal sectional view taken through a cut-off type corn picker employing the stalk forwarder of this invention;

Figure 2 is a horizontal longitudinal sectional view taken on the line 2—2 of Figure 1; and Figure 3 is a top plan view of the device of this invention.

As shown in the drawings:

The reference numeral 10 indicates generally a housing adapted to enclose the elements of a corn picker. The portions of the corn picker which are not shown are relatively standard and, inasmuch as they form no part of the present invention, it is thought advisable to leave them out of the drawings. In any event, the picker is of the cut-off type in which the stalks with their ears and leaves are raised and deposited on a horizontal slat-type conveyor 11, as shown in Figures 1 and 2. The stalk travels rearwardly with the butt end first. The horizontal and rearwardly running conveyor 11 is equipped with cross slots 12 which cause aggressive movement of the corn stalks. However, in addition to the cross slats 12 on the conveyor 11, a paddle-type feed wheel 13 is positioned above the conveyor 11 and cooperates with the slats 12 on the conveyor 11 for causing the stalks 14 to travel rearwardly without interruption. The paddle wheel 13 is attached to a driven shaft 15 which is journaled in the housing 10. At the rear of the corn picker and spaced considerably to the rear of the end of the conveyor 11 stand vertically positioned snapping rolls 16 and 17.

Between the end of the horizontal longitudinal conveyor 11, as defined by the sprocket 18 and the snapping rolls 16 and 17, lies a husking bed 19. The husking bed 19 is transversely disposed well below the level of the horizontal conveyor 11 and also beneath the lower end of the snapping rolls 16 and 17. The bed includes two pair of husking rolls 20 and 21. Each pair of rolls consists of a rubber covered roll 22 and 23 and a wooden roll 24 and 25. The rubber covered rolls 22 and 23 are relatively greater in diameter than the wooden rolls and are journaled for rotation slightly above the wooden rolls to enable ear forwarder conveyors 26 and 27 to run lengthwise of and directly above the wooden rolls. The husks are of course pulled down between the pairs of rolls 20 and 21 and dropped into transversely positioned auger conveyor 28. The ear forwarder conveyors carry the ears lengthwise of the pairs of rolls 20 and 21 and thence join with a wagon elevator (not shown).

The gap or wide space between the conveyor 11 and the snapping rolls 16 over which the stalks must bridge is so large that without additional guiding or stalk forwarding means the stalks tend to fall down onto the husking bed, causing jamming and clogging to such an extent that the entire corn picker must be stopped and the husking bed cleaned out. This is true especially when there is a great quantity of stalks being fed to the machine at approximately the same time. It would, of course, be possible to extend the conveyor 11 to a point closer to the snapping rolls. However, it is especially desirable to have the ears hanging downwardly from the stalks when they are snapped by the snapping rolls 16 and 17. It has been found by experiment that the ears are snapped much easier at right angles to the stalk during travel through the snapping rolls, and hence any assisting means provided for the stalk between the conveyor 11 and the snapping rolls 16 and 17 must permit the ears to hang downwardly and further must be able to accommodate great quantities of stalks simultaneously.

The stalk forwarder means of this invention takes the form of cooperative feeding rolls 29 and 30. These feed rolls are journaled around vertical shaft extensions 31 and 32, respectively, in arms 33 and 34. The rear ends of the arms are journaled on the snapping roll shafts 35 and 36 extending upwardly from the snapping rolls 16 and 17, respectively. The arms 33 and 34 are adapted to hinge about the shafts 35 and 36 causing various degrees of space between the rolls 29 and 30. As best shown in Figure 3, a spring 37 joins the arms 33 and 34 tending to cause the feed rolls 29 and 30 to remain in yieldable contact with each other. The degree of spread of the arms 33 and 34 varies with the number of stalks being fed therethrough. The arms are limited in their inward swing by lugs 38 and 39 which are adapted to contact each other, thereby preventing the feed rolls 29 and 30 from becoming too closely positioned. The outward swing of the arms 33 and 34 is limited by lugs 40 and 41 projecting upwardly from the top of the housing 10. Further limitations on the swing of the arms 33 and 34 takes the form of arcuate slots 42 and 43 in the top of the housing 10. The vertical shafts 31 and 32 of the feed rolls 29 and 30 project upwardly through the arcuate slots 42 and 43 at which point the arms 33 and 34 are journaled therearound. The feed rolls 29 and 30 are journaled only at their upper ends so that the bottom of the rolls are unjournaled and unsupported. This permits the ears on the stalks to hang downwardly without interference and, as previously stated, is conducive to ready snapping.

The arms 33 and 34 are equipped with collars 44. Above the collars 44 are sprockets 45 and 46 which carry driving chains 47 and 48. These driving chains project forwardly from sprockets 49 and 50 which are mounted on the snapping roll shafts 35 and 36, respectively. Idler sprockets 51 and 52 are adjustably mounted in projections 53 and 54 on the arms 33 and 34, respectively. These idler sprockets are for the purpose of tightening the chains 47 and 48 by adjustable movement in slots 55 and 56.

The shaft 57 is driven by means of an auxiliary engine or from the power take-off of the tractor. Keyed or otherwise attached to the shaft 57 is a bevel gear 58 adapted to drive a bevel gear 59 which causes direct rotation of the snapping roll 16 and by means of spur gears 60 causes opposite rotation of the snapping roll 17. Rotational drive of the snapping rolls 16 and 17 thereby imparts rotation to the sprockets 49 and 50 and hence the feed rolls 29 and 30 in the same manner.

In operation the standing corn stalks are severed from the ground and the entire stalk with all its foliage and ears of corn is put onto the rearwardly running horizontal conveyor 11, and with the aid of the paddle wheel 13 feeds the stalks butt end first through the stalk forwarding rolls 29 and 30 which enable the stalks to bridge the gap between the end of the conveyor 11 and the snapping rolls 16 and 17. If a number of stalks are put through the machine at the same time, the feed rolls 29 and 30 may swing outwardly away from each other but the tension caused by the spring 37 maintains them as close together as possible and with sufficient force to cause rearward feeding of the stalks of corn 14. An ear 61 is shown just leaving the horizontal conveyor 11, and an ear 62 is shown between the conveyor 11 and the snapping rolls 16 and 17. It will be noted that inasmuch as there is no journal support or no interconnection between the ends of the rolls 29 and 30, the ears 61 and 62 may hang vertically at right angles to the stalk 14 during their travel through the stalk forwarding rolls 29 and 30. In this position the ears 61 and 62 are readily snapped by the snapping rolls 16 and 17 and fall forwardly onto the husking bed 19. The husks are removed and the ear carried longitudinally of the rolls and then up a wagon elevator.

The primary function of the stalk forwarding rolls 29 and 30 is, of course, to prevent clogging and jamming of the space above the husking bed. However, in addition to preventing such clogging, the rolls 29 and 30 tend to guide the stalks into the vertical snapping rolls. Additional guide means are provided, as shown in Figure 2, at 63 and 64.

After the stalks 14 pass through the snapping rolls 16 and 17, they proceed out the end of the machine. A grain saver in the form of a shaking pan 65 is adapted to shake loose all kernels of corn which pass out with the stalks 14. These grains of corn drop through the shaking pan 65, and by means of suitable conveyors are carried to the wagon elevator and are loaded with the ears of corn which pass through the machine in the regular manner.

Many details of construction may be varied throughout a wide range without departing from the principles disclosed herein, and I therefore do not propose limiting the patent granted hereon otherwise than as necessitated by the appended claims.

What is claimed is:

1. A corn machine having a housing, snapping and husking rolls mounted in said housing, said husking rolls mounted in said housing, said husking rolls positioned horizontally and transversely of said housing at a location forwardly of and beneath said snapping rolls, and a pair of cooperative stalk forwarding rolls vertically positioned and journaled in the housing at their upper ends, the lower ends of the forwarding rolls being unjournaled and depending over the husking rolls forwardly of the snapping rolls.

2. A corn treating machine having a housing, snapping rolls vertically mounted in said housing, husking rolls horizontally mounted in housing forwardly of and beneath the snapping rolls, a conveyor adapted to feed severed stalks of corn to a point above said husking rolls, and a pair of vertically positioned cooperative stalk forwarding rolls depending from said housing above said husking rolls and adapted to feed and guide the stalks leaving the slatted conveyor to the vertically positioned snapping rolls.

3. A corn treating machine having a housing, snapping rolls vertically mounted in said housing, husking rolls horizontally mounted in said housing forwardly of and beneath the snapping rolls, a conveyor adapted to feed severed stalks of corn to a point above said husking rolls, and a pair of vertically positioned cooperative stalk forwarding rolls journaled at their upper ends in said housing above said husking rolls.

4. A corn treating machine having a housing, snapping rolls vertically mounted in said housing, husking rolls horizontally mounted in said housing forwardly of and beneath the snapping rolls, a conveyor adapted to feed severed stalks of corn to a point above said husking rolls, and a pair of vertically positioned cooperative stalk forwarding rolls journaled at their upper ends in said housing above said husking rolls, said stalk forwarding rolls being unjournaled at their lower ends to permit ears on said stalks to hang downwardly unhindered.

5. A corn treating machine having a housing, snapping rolls vertically mounted in said housing, husking rolls horizontally mounted in said housing forwardly of and beneath the snapping rolls, a conveyor adapted to feed severed stalks of corn to a point above said husking rolls, and a pair of vertically positioned stalk forwarding rolls mounted at their upper ends in the housing, and spring means holding said rolls in cooperative engagement and accommodating various quantities of stalks.

6. A corn treating machine having a housing, snapping rolls vertically mounted in said housing, husking rolls horizontally mounted in said housing forwardly of and beneath the snapping rolls, a slatted conveyor adapted to feed severed stalks of corn in a substantially horizontal position to a point above said husking rolls, a pair of arms pivotally mounted on the top of said housing for horizontal swinging movement, a feed roll depending vertically from and journaled for rotation at their upper ends in each of said arms through arcuate slots formed in said housing over said husking rolls and the feed rolls cooperating with each other to forward stalks from the slatted conveyor to said vertically positioned snapping rolls.

7. A corn treating machine having a housing, snapping rolls vertically mounted in said housing, husking rolls horizontally mounted in said housing forwardly of and beneath the snapping rolls, a slatted conveyor adapted to feed severed stalks of corn to a point above said husking rolls, a pair of arms pivotally mounted on the top of said housing for horizontal swinging movement, a feed roll depending from and journaled at its upper end in each of said arms and extending downwardly through arcuate slots in said housing to a position over said husking rolls and the feed rolls cooperating with each other to forward stalks from the slatted conveyor to said vertically positioned snapping rolls, and spring means joining said arms to provide a resilient yielding between said stalk forwarding rolls.

ROBERT P. MESSENGER.

REFERENCES CITED

The following references are of record in the file of this patent:

UNITED STATES PATENTS

| Number | Name | Date |
|---|---|---|
| 702,344 | Crosby | June 10, 1902 |
| 705,311 | Alexander et al. | July 22, 1902 |
| 734,035 | Bellairs et al. | July 21, 1903 |
| 1,430,671 | Morral et al. | Oct. 3, 1922 |
| 1,461,748 | Boyer | July 17, 1923 |
| 2,352,501 | Slavicek | June 27, 1944 |